United States Patent Office 3,759,836
Patented Sept. 18, 1973

3,759,836
PREPARATION OF SULFUR SLURRIES FOR
PIPELINE TRANSPORTATION
Leland F. Collins, Moraga, Robert C. Quinn, Oakland, and Paul G. Wilhelmsen, Alamo, Calif., assignors to Shell Oil Company, Houston, Tex.
No Drawing. Filed Sept. 15, 1971, Ser. No. 180,918
Int. Cl. B01f 17/00
U.S. Cl. 252—309                                2 Claims

ABSTRACT OF THE DISCLOSURE

An improved method of making concentrated sulfur slurries particularly designed for pipeline transportation.

The present invention relates to a new and novel method of making a highly concentrated sulfur slurry for pipeline transportation in which the sulfur is essentially in particles of 10–1000 microns and is present in a liquid carrier; said slurry being resistant to apglomeration, phase separation, sticking, plating, etc., but is rather stable, readily pumpable even on restart after pipeline shutdown without the necessity of using complicated means of restart due to normal tendencies of such a slurry to plug pipelines particularly on shutdown. This is accomplished in accordance with the present invention by adding to a liquid carrier, into which molten sulfur is injected, a small amount of particular classes of surfactants which are soluble in the liquid carrier and are capable of forming sulfur particles and which inhibit interparticle dendrite formation of the sulfur into highly viscous agglomerate which tend to form clusters and deposit on contacting surfaces thereby causing plugging, clogging, etc.

BACKGROUND OF THE INVENTION

As evidenced from the state of the art as exemplified by U.S. Patents Nos. 2,798,772; 2,917,345 or 2,947,578, pipeline transportation of sulfur in slurry form is highly advantageous over other forms of transportation such as railroad, tankers, barges, etc., since larger quantities of sulfur at lower cost can be thus effectively transported while eliminating handling health and pollution problems. However, in order to accomplish this, the preparation of the slurry in sufficiently high concentration and its handling in pipelines is a complicated one due to the tendency of the sulfur in slurry form to agglomerate, settle, plug the pipeline and cause difficulties on restart. This is clearly evidenced by reference to the state of the art as illustrated by the U.S. Patents Nos. 3,582,147; 3,547,497 or 3,575,470.

OBJECTS OF THE INVENTION

It is an object of the present invention to prepare a stable sulfur-slurry which resists interparticle nucleation and agglomeration.

Still another object of the present invention is to prepare a sulfur slurry which is resistant to agglomeration and does not contain non-spherical shaped sulfur particles.

Still another object of the present invention is to prepare a sulfur slurry particularly designed for pipeline transportation which is non-agglomerating, non-clogging and is susceptible to easy restart.

Still another object of this invention is to pipeline transport sulfur slurries prepared by the method of the present invention.

SUMMARY OF THE INVENTION

It has now been discovered that stable concentrated sulfur-liquid slurries particularly suited for pipeline transportation can be prepared by injecting molten-sulfur, into a suitable liquid carrier such as a liquid hydrocarbon, containing a soluble surfactant capable of preventing dendrite formation between the sulfur particles as themonoclinic sulfur particles convert to the orthorhombic form. It appears that orthorhombic nuclei on the surface of even one particle are responsible for crystals growth between sulfur particles and thereby cause agglomeration. Also, these surfactants tend to inhibit increase in viscosity with time as the molten sulfur injection process continues. This is accomplished by coating the sulfur particles and thereby preventing their fusion into agglomerates.

Suitable surfactants capable in functioning in the manner described above include oil-soluble non-ash forming surfactants, preferably basic amines, such as described in U.S. Patents Nos. 2,944,025; 2,980,613, and 3,116,250, particularly those identified as polyalkenyl succinimides commercially identified as OLOA 1200 (Chevron Chemical Company), the chemical structures of which is:

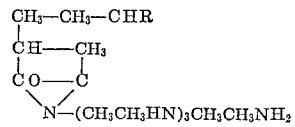

where the $CH_2$—$CH$=$CH$—$R$ radical is polyisobutylene of MW about 1000 as described in Jr. of Inst. of Pet., July, 1968, pages 198, 210 as well as basic amines and $NH_3$ gas and $NH_4OH$. Other non-ash polymers include copolymer of alkyl methacrylates and N-vinyl pyrolidone or copolymers of alkyl methacrylates and vinyl pyridine or copolymers of alkyl methacrylates and polyamines or copolymers of olefine, e.g., polyisobutylene and polyamine, e.g., ethylene diamine tetraethylene pentaamine. Other suitable surfactants are organic sulfonates such as alkaline earth metal petroleum sulfonates, e.g., Ca or Ba petroleum sulfonates. Preferred is the polyalkenyl succinimides, e.g., OLOA 1200 and Ca petroleum sulfonate. The amount of surfactant added to the liquid carrier can range from about 0.01% to about 5% by weight preferably between about 0.1% and about 2% based on the liquid carrier concentration.

When the liquid carrier used in the slurry preparation is a hydrocarbon, it can range in viscosity from a light petroleum fraction such as liquefied petroleum gas (LPG), gasoline, kerosene, fuel oil, lube oil, petroleum distillates, condensates, crude oil and mixtures thereof.

Sulfur slurry prepared by the method of the present invention having high sulfur concentration (30–60% v.) has Newtonian flow characteristics which obviate the troublesome problems normally resulting with solids slurries transported through pipelines and generally having Bingham plastic or pseudo-plastic flow characteristics. The latter two flow characteristics result in separation, settling and other undesirable problems which are now avoided due to the Newtonian flow characteristics of slurries prepared by the incremental process of this invention.

PREFERRED EMBODIMENT OF THE INVENTION (A) Molten sulfur was injected into a petroleum oil fraction (condensate) under agitation containing about 1% OLOA 1200 (polyalkylene succinimide) until the sulfur concentration was about 40%. No agglomeration of the sulfur particles in the thus formed slurry was observed even on standing overnight.

(B) Molten sulfur was injected into a petroleum oil fraction (condensate) under agitation containing about 1% Ca petroleum sulfonate until the sulfur concentration was about 40%. No agglomeration of the sulfur particles in the thus formed slurry was observed even on standing overnight.

(C) Molten sulfur was injected into a crude oil under agitation containing about 1% OLOA 1200 (polyalkylene succinimide) until the sulfur concentration was about 40%. No agglomeration of the sulfur particles in the thus formed slurry was observed even on standing overnight.

(D) Molten sulfur was injected into a crude oil under agitation containing about 1% Ca petroleum sulfonate until the sulfur concentration was about 40%. No agglomeration of the sulfur particles in the thus formed slurry was observed even on standing overnight.

Although any suitable vessel can be used in preparing the slurry of the present invention, the method of sulfur injection and equipment described in copending application Ser. No. 26,278, filed Apr. 7, 1970, is preferred.

Sulfur-oil slurries (A) and (B) were injected into a pipeline and transported over long distances of 500 miles without sulfur plating on the pipe wall or causing clogging of the line. When the line transporting slurry (C) was shut down for about 24 hours, no clogging or plugging of the line resulted by the shutdown and flow was readily commenced on re-starting.

At the terminal end of the line the sulfur can be removed from the liquid hydrocarbon by suitable means such as described in U.S. Patent No. 2,798,772, and the sulfur purified by methods as described in U.S. Patents Nos. 2,809,885 or 3,489,677, which comprise treating oil contaminated sulfur with an aqueous solution containing a mixture of alkali hydrosulfide and corresponding hydroxide, e.g., ammonium hydrosulfide and ammonium hydroxide or by other suitable means such as sulfur can be recovered from the oil slurry by centrifugation or filtration of particulate sulfur, melting the particles and liquid-liquid extraction with a hydrocarbon solvent containing 10-50% aromatics. Thus, at the receiving terminal the sulfur slurry is filtered and washed. The recovered sulfur is then melted and purified by liquid-liquid extraction with an aromatic hydrocarbon such as cumene. Also, if desired, the sulfur can be steam stripped to remove any dissolved solvent and then filtered to recover bright yellow sulfur. Also, it has been found that the use of surfactants as described and $H_2S$ instead of asphaltines as described in U.S. Patent 3,582,147, results in sulfur which does not have coloration problem upon terminal sulfur recovery.

The foregoing description of the invention is merely intended to be explanatory thereof. Various changes in the details of the described method may be made within the scope of the appended claims without departing from the spirit of the invention.

What is claimed is:

1. A method for rendering a sulfur-hydrocarbon slurry agglomeration resistant comprising providing a polyalkenyl succinimide in the slurry.

2. The method of claim 1 wherein the amount of succinimide is between about 0.01% and about 5% by weight based on the hydrocarbon.

References Cited
UNITED STATES PATENTS

| | | | |
|---|---|---|---|
| 3,582,148 | 6/1971 | Martin et al. | 302—66 |
| 2,844,541 | 7/1958 | Work | 252—309 |
| 3,432,209 | 3/1969 | Scott | 302—66 |
| 3,606,483 | 8/1971 | Gable | 302—66 |
| 2,348,736 | 5/1944 | Heath | 252—314 X |
| 3,380,784 | 4/1968 | Yingst et al. | 302—66 |
| 3,539,225 | 11/1970 | Vondrak | 302—66 |

GEORGE O. PETERS, Primary Examiner

U.S. Cl. X.R.

252—394; 302—66